(12) United States Patent
Klinger

(10) Patent No.: US 11,279,188 B2
(45) Date of Patent: Mar. 22, 2022

(54) WHEEL SUSPENSION FOR A MOTOR VEHICLE, HOLDING ARRANGEMENT, AND MOTOR VEHICLE

(71) Applicant: AUDI AG, Ingolstadt (DE)

(72) Inventor: Thomas Klinger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/966,255

(22) PCT Filed: Feb. 12, 2019

(86) PCT No.: PCT/EP2019/053356
§ 371 (c)(1),
(2) Date: Jul. 30, 2020

(87) PCT Pub. No.: WO2019/201490
PCT Pub. Date: Oct. 24, 2019

(65) Prior Publication Data
US 2021/0039462 A1    Feb. 11, 2021

(30) Foreign Application Priority Data

Apr. 17, 2018  (DE) .................... 10 2018 205 788.5

(51) Int. Cl.
*B60G 3/20*    (2006.01)
*B60G 7/02*    (2006.01)

(52) U.S. Cl.
CPC ............. *B60G 3/20* (2013.01); *B60G 7/02* (2013.01); *B60G 2200/144* (2013.01);
(Continued)

(58) Field of Classification Search
CPC ...... B60G 3/20; B60G 7/02; B60G 2200/144; B60G 2204/143; B60G 2204/418;
(Continued)

(56) References Cited

U.S. PATENT DOCUMENTS 3,161,419 A    12/1964  Schaaf
3,983,957 A *  10/1976  Silverman ................ G01V 1/09
                                                     181/121
(Continued)

FOREIGN PATENT DOCUMENTS

DE       3730212 A1    3/1989
DE     69420836 T2     5/2000
(Continued)

OTHER PUBLICATIONS

German Search Report dated Feb. 27, 2019 in corresponding German Application No. 10 2018 205 788.5; 20 pages; Machine translation attached.

(Continued)

*Primary Examiner* — Darlene P Condra
(74) *Attorney, Agent, or Firm* — Maier & Maier, PLLC

(57) ABSTRACT

A wheel suspension, having a wheel mount, on which at least one wheel is to be rotatably mounted, having at least one upper suspension arm flexibly coupled with the wheel mount for guiding the wheel, having at least one lower suspension arm flexibly coupled with the wheel mount for guiding the wheel, and having at least one strut, which has at least one bearing point to be arranged fixed on the vehicle body, via which the strut is to be articulated at least indirectly on the vehicle body of the motor vehicle, wherein one of the suspension arms is flexibly coupled with the strut, and wherein the one suspension arm is free of a bearing point to be arranged fixed on the vehicle body, via which the one suspension arm is to be mounted on the vehicle body.

18 Claims, 3 Drawing Sheets

(52) U.S. Cl.
CPC .. *B60G 2204/143* (2013.01); *B60G 2204/418* (2013.01); *B60G 2204/422* (2013.01)

(58) Field of Classification Search
CPC .......... B60G 2204/422; B60G 2200/18; B60G 2200/46; B60G 2204/421
See application file for complete search history.

(56) References Cited

U.S. PATENT DOCUMENTS

| | | | |
|---|---|---|---|
| 4,911,466 A | 3/1990 | Blair | |
| 5,284,353 A * | 2/1994 | Shinji | B60G 3/20 280/124.136 |
| 5,286,052 A | 2/1994 | Lukianov | |
| 5,346,241 A | 9/1994 | Lee | |
| 5,498,019 A * | 3/1996 | Adato | B60G 3/26 280/124.136 |
| 5,597,171 A * | 1/1997 | Lee | B60G 3/20 280/124.138 |
| 5,620,199 A * | 4/1997 | Lee | B60G 3/265 280/124.138 |
| 5,697,633 A * | 12/1997 | Lee | B60G 3/26 280/124.136 |
| 7,222,863 B2 * | 5/2007 | Deal | B60G 3/01 280/124.135 |
| 7,246,806 B2 * | 7/2007 | Andre | B60G 3/20 280/124.106 |
| 7,712,748 B2 | 5/2010 | Deal et al. | |
| 8,662,510 B2 * | 3/2014 | Christensen | B60G 7/02 280/124.148 |
| 10,414,233 B2 * | 9/2019 | Shi | B60G 7/008 |
| 2008/0258418 A1 * | 10/2008 | Christensen | B60G 3/26 280/124.116 |
| 2011/0254244 A1 | 10/2011 | Christensen | |
| 2018/0089281 A1 * | 3/2018 | Li | G06F 16/2471 |

FOREIGN PATENT DOCUMENTS

| | | |
|---|---|---|
| EP | 0716942 B1 | 3/2000 |
| JP | S63-265709 A | 11/1988 |
| JP | S64-56216 A | 3/1989 |
| SU | 1592171 A1 | 9/1990 |

OTHER PUBLICATIONS

International Search Report (with English translation) and Written Opinion (with Machine translation) dated May 27, 2019 in corresponding International Application No. PCT/EP2019/053356; 22 pages.

Notification of Transmittal of Translation of the International Preliminary Report on Patentability dated Oct. 29, 2020, in connection with corresponding international application No. PCT/EP2019/053356 (8 pages).

* cited by examiner

WHEEL SUSPENSION FOR A MOTOR VEHICLE, HOLDING ARRANGEMENT, AND MOTOR VEHICLE

FIELD

The disclosure relates to a wheel suspension for motor. The disclosure additionally relates to a holding arrangement and a motor vehicle.

BACKGROUND

Such a wheel suspension for a motor vehicle, designed in particular as a passenger vehicle, and a holding arrangement of at least one wheel on a vehicle body of a motor vehicle can be inferred as already known, for example, from JP S63 265709 A. In the holding arrangement, the wheel is articulated on the vehicle body via a wheel suspension, so that the wheel suspension permits relative movements extending at least in the vehicle vertical direction between the wheel and the vehicle body and thus compression and extension movements of the wheel in relation to the vehicle body. In the scope of a compression movement, the wheel moves upward in relation to the vehicle body in the vehicle vertical direction, wherein the wheel moves downward in relation to the vehicle body in the vehicle vertical direction in the scope of an extension movement.

The wheel suspension has a wheel mount, on which the wheel is to be mounted or is mounted rotatably. Furthermore, the wheel suspension comprises at least one upper suspension arm flexibly coupled with the wheel carrier for guiding the wheel and at least one lower suspension arm flexibly coupled with the wheel controller for guiding the wheel, wherein the lower suspension arm is arranged below the upper suspension arm in the vehicle vertical direction. The wheel suspension furthermore comprises a strut, which has at least one bearing point to be arranged fixed on the vehicle body or fixed on the vehicle body, via which the strut is to be articulated at least indirectly on the vehicle body of the motor vehicle. The bearing point to be arranged fixed on the vehicle body or fixed on the vehicle body is a bearing point on the vehicle body, which defines precisely one pivot axis, for example, around which the strut is pivotable in relation to the vehicle body. The feature that the bearing point is to be arranged fixed on the vehicle body or is fixed on the vehicle body is to be understood in particular to mean that the pivot axis defined by the bearing point is fixed at least indirectly or directly on the vehicle body, i.e., is immovable in relation to the vehicle body.

In addition, U.S. Pat. No. 7,712,748 B2 discloses a wheel suspension for a motor vehicle. Furthermore, a wheel suspension system can be inferred as known from EP 0 716 942 B1, having a wheel mount for rotatably supporting the wheel, which is arranged laterally at a predetermined distance from a vehicle frame.

SUMMARY

The object of the present invention is to refine a wheel suspension, a holding arrangement, and a motor vehicle of the type mentioned at the outset in such a way that an attachment of the wheel on the vehicle body which is particularly favorable with respect to installation space and weight can be implemented.

The subject is achieved according to exemplary embodiments of the invention by a wheel suspension and by a holding arrangement and by a motor vehicle. Advantageous designs having expedient refinements are specified in the rest of the disclosure.

A first aspect of the invention relates to a wheel suspension for a motor vehicle, in particular for a passenger vehicle. The wheel suspension comprises at least one wheel mount, on which at least one wheel of the motor vehicle is to be mounted or is mounted rotatably. The wheel is a ground contact element, wherein the motor vehicle comprises the wheel in its completely produced state. The motor vehicle is supportable or is supported downwards in the vehicle vertical direction on a roadway or on ground via the wheel in its completely produced state. The wheel suspension comprises at least one upper suspension arm flexibly coupled with the wheel mount for guiding the wheel. In addition, the wheel suspension comprises at least one lower suspension arm flexibly coupled with the wheel mount for guiding the wheel. The lower suspension arm is arranged below the upper suspension arm in the vehicle vertical direction. In addition, the wheel suspension comprises a strut designed as a vertical strut or referred to as a vertical strut, for example, which has at least one bearing point, which is to be arranged fixed on the vehicle body and is also referred to as the first bearing point hereafter. The strut is to be articulated or is articulated at least indirectly on the vehicle body of the motor vehicle via the bearing point. The bearing point to be arranged fixed on the vehicle body is also referred to as a body-side bearing point.

In the completely produced state of the motor vehicle, the bearing point is fixed on the vehicle body. The feature that the bearing point is to be arranged fixed on the vehicle body or is fixed on the vehicle body is to be understood in particular to mean that the bearing point, in particular in the completely produced state of the motor vehicle, defines precisely one pivot axis common to the strut and the vehicle body, around which the strut is pivotable in relation to the vehicle body. The pivot axis is immovable in relation to the vehicle body or is fixed on the vehicle body, possibly except for any technically related and/or intentionally or consciously provided elasticities, in particular of a possibly provided elastomer bearing or rubber bearing associated with the bearing point or arranged on the bearing point, via which the strut is to be articulated or is articulated on the vehicle body elastically and thus resiliently. The elastomer bearing or rubber bearing permits slight relative movements between the strut and the vehicle body to implement a particularly high level of driving comfort, wherein such relative movements are damped by means of the elastomer bearing or rubber bearing. The feature that the bearing point is to be arranged fixed on the body or is fixed on the vehicle body is therefore to be understood in particular to mean that the bearing point is not in turn held on the vehicle body, for example, via a further component pivotably mounted on the vehicle body and is not pivotable in relation to the vehicle body.

The feature that the strut is to be articulated or is articulated at least indirectly on the vehicle body via the bearing point is to be understood to mean that the strut is to be mounted or is mounted, for example, via the bearing point, in particular directly, on the vehicle body or itself or, in particular directly, on an auxiliary frame, which is in turn held, in particular mounted on the vehicle body. However, even if the strut is mounted on the vehicle body by means of the auxiliary frame, the bearing point is to be arranged fixed on the body or is fixed on the vehicle body, which is to be understood to mean—as described above—in the scope of the invention that the pivot axis defined by the bearing point is immovable in relation to the vehicle body and cannot be pivoted in relation to the vehicle body.

The bearing point is therefore a bearing point fixed on the vehicle body or fixed on the auxiliary frame. The direct mounting of the strut on the vehicle body, which is designed in particular as a self-supporting vehicle body, or on the auxiliary frame is to be understood in particular to mean that the precisely one above-mentioned pivot axis common to the strut and the vehicle body or the auxiliary frame is defined or fixed by the bearing point, around which the strut is pivotable in relation to the auxiliary frame or in relation to the vehicle body. In particular, the direct mounting of the strut on the auxiliary frame or in the vehicle body is to be understood to mean that the strut is not mounted, for example, by means of an intermediate element flexibly connected to the strut, on the one hand, and flexibly connected to the auxiliary frame or the vehicle body, on the other hand, on the vehicle body or on the auxiliary frame, but rather the strut is articulated directly on the auxiliary frame or on the vehicle body without the use of such an intermediate element.

The wheel suspension permits translational relative movements between the wheel and the vehicle body extending at least in the vehicle vertical direction, so that the wheel suspension permits compression and extension movements of the wheel in relation to the vehicle body. In the scope of a compression movement, the wheel moves upward in relation to the vehicle body in the vehicle vertical direction, wherein the wheel moves downward in relation to the vehicle body in the vehicle vertical direction in the scope of an extension movement.

To be able to implement an attachment of the wheel on the vehicle body which is particularly favorable with respect to installation space and weight, it is provided according to the invention that one of the suspension arms, preferably the upper suspension arm, is flexibly coupled with the strut, wherein the one suspension arm is free of a bearing point to be arranged fixed on the vehicle body or fixed on the vehicle body, via which the one suspension arm is to be mounted, in particular articulated, on the vehicle body. In other words, on the vehicle body side, the one suspension arm is to be articulated or is articulated on the vehicle body exclusively at the strut and by means of the strut, so that mounting of the one suspension arm on the vehicle body via a bearing point to be arranged fixed on the body or fixed on the body is omitted.

In particular it is provided, for example, that the one suspension arm is to be articulated or is articulated on the vehicle body exclusively by means of the strut and by means of the wheel mount and the other suspension arm, in particular the lower suspension arm, so that mounting of the one suspension arm on the vehicle body via a bearing point to be arranged fixed on the vehicle body is omitted or is not provided. In other words, the one suspension arm does not have a bearing point fixed on the vehicle body, i.e., a bearing point to be arranged fixed on the vehicle body or fixed on the vehicle body, but rather is instead mounted on the strut. This means that a rotational axis of the one suspension arm, which pivots in relation to the vehicle body around the rotational axis in particular during compression and extension movements, is not mounted directly via bearing on the auxiliary frame or on the vehicle body. Furthermore, it is provided according to the invention that the strut is flexibly attached on the other suspension arm by means of at least one coupling flexibly attached to the other suspension arm, preferably to the lower suspension arm, and articulated with the strut. The strut is thus mounted, for example, in particular directly on the auxiliary frame or on the vehicle body and is flexibly connected to the coupling, which is also flexibly connected to the other suspension arm. The other suspension arm is a further wheel suspension arm provided in addition to the one suspension arm and with which the coupling is flexibly coupled. For example, the other suspension arm is designed as a wishbone for guiding the wheel. The one suspension arm is also a wheel suspension arm for guiding the wheel.

The invention is based in particular on the following finding: In principle, different types of wheel suspensions or axles exist, which may be classified, for example, in a first category and a second category. The axle types associated with the first category have respective upper suspension arms and corresponding suspension arm bearings on the vehicle body. The axle types associated with the second category do not have such suspension arm bearings on the vehicle body for upper suspension arms. Examples of axle types associated with the first category are multi-link axles, double wishbone axles, control arm axles, or trapezoidal-link axles. Examples of axle types associated with the second category are McPherson axles and semi-trailing link axles. In contrast to conventional wheel suspensions or axle types or axles known in particular from the prior art, the wheel suspension according to the invention is distinguished in particular in that the above-mentioned rotational axis of the one suspension arm, in particular the upper suspension arm, is not mounted directly via bearings on the auxiliary frame or the vehicle body.

In addition, the coupling is provided, by means of which the other suspension arm, in particular the lower suspension arm, is flexibly coupled with the strut. Conventional wheel suspensions or axles, which are associated with the first category, require one or more bearing points on the vehicle body at the height of an upper suspension arm plane. In the case of rear axles, they are generally located in a region which, on the one hand, would be well usable with respect to installation space for gas bottles, other energy accumulators, measures to be taken in case of accidents on the shell, or other components. In addition, the bearing points have to be attached sufficiently rigidly, which would accordingly be accompanied by material expenditure and thus weight for the auxiliary frame. Axles or axle types associated with the second vehicle body have the disadvantage in the case of McPherson axles that the shock absorber used is wheel-guiding. Therefore, a reduced camber stability, on the one hand, and high source force loads on the shock absorber, on the other hand, are indispensable, which in turn result in worse cushioning and significantly larger dimensioning of the piston rod.

In the case of control arm axles or comparable axles, in particular having rigid guiding of the wheel mount, the kinematic degrees of freedom are restricted, i.e., an optimal wheel position cannot be achieved for every driving situation. The above-mentioned disadvantages and problems can be solved by means of the wheel suspension according to the invention. Since a bearing point is not to be provided on the vehicle body, i.e., a bearing point to be arranged fixed on the body or fixed on the vehicle body, via which the one suspension arm is to be mounted or is mounted on the vehicle body, the installation space requirement can be kept particularly small. In this way, installation space can be used which is conventionally not usable. In particular, the installation space can be used for arranging longitudinal members, gas bottles, energy accumulators, etc. Furthermore, an upper plane of the auxiliary frame can be dispensed with in comparison to conventional solutions, whereby the weight of the motor vehicle can be kept particularly low as a whole. In addition, increased camber stability and improved cushioning, in particular in relation to McPherson axles, can be implemented in comparison to the prior art.

In one particularly advantageous design of the invention, the coupling is mounted directly on the other suspension arm, in particular on the lower suspension arm. This is to be understood to mean that by the direct mounting of the coupling on the other suspension arm, precisely one pivot axis common to the coupling and the other suspension arm is formed or defined, around which the coupling is mounted in relation to the other suspension arm, wherein this pivot axis is immovable in relation to the coupling and in relation to the other suspension arm. The installation space can thus be kept particularly small. The wheel mount, the one suspension arm, the other suspension arm, the coupling, and the strut are, for example, respective components of the wheel suspension, wherein, for example, each two of the components can be mounted directly on one another and thus flexibly coupled with one another. Such a direct mounting of two of the components on one another is to be understood to mean that a pivot axis common to the components directly mounted on one another is defined or formed, around which the components mounted directly on one another can be pivoted in relation to one another, wherein the pivot axis is immovable in relation to the components mounted directly on one another, possibly except for any technically related and/or intentionally provided elasticities.

In the scope of the direct mounting, at least one bearing element can be provided, via which the components directly mounted on one another are directly mounted on one another. The direct mounting is therefore not necessarily to be understood to mean that the components directly mounted on one another directly mutually touch, but rather no further component articulated with the components directly mounted on one another is provided, by means of which the components directly mounted on one another are pivotably mounted on one another. In particular, the direct mounting can be understood to mean that the components directly mounted on one another are mounted pivotably on one another via respective bearing regions, the respective center axes of which coincide and coincide with the above-described pivot axis. A further embodiment is distinguished in that the coupling is mounted directly on the strut, whereby the installation space requirement can be kept to a particularly small scope.

In a further design of the invention, the one suspension arm, in particular the upper suspension arm, is mounted directly on the strut. The number of parts and thus the weight, the costs, and the installation space requirement can thus be kept to a particularly small scope.

In one particularly advantageous embodiment of the invention, the strut has at least one bearing point fixed on the strut, which is arranged in the vehicle vertical direction below the first bearing point to be arranged fixed on the vehicle body. An arrangement of the one suspension arm on the strut which is particularly favorable with respect to installation space can thus be ensured.

In a further design of the invention, the other suspension arm, in particular the lower suspension arm, has at least one further bearing point to be arranged fixed on the vehicle body, via which the other suspension arm is to be at least indirectly articulated on the vehicle body of the motor vehicle. In particular, for example, the other suspension arm is to be mounted or is mounted directly on the auxiliary frame or directly on the vehicle body via the further bearing point, whereby an attachment of the wheel to the vehicle body which is particularly favorable with respect to weight and installation space can be ensured.

It is thus furthermore been shown to be particularly advantageous if the one suspension arm, in particular the upper suspension arm, is mounted directly on the wheel mount. The number of parts, the installation space requirement, and the weight and also the costs can be kept low in this way.

To implement a design of the wheel suspension which is particularly favorable with respect to installation space, weight, and costs, it is provided in a further design of the invention that the other suspension arm, in particular the lower suspension arm, is mounted directly on the wheel mount.

To implement particularly advantageous guiding of the wheel in a manner favorable for weight and costs, in a further design of the invention, it is provided that the other suspension arm, in particular the lower suspension arm, has two suspension arm parts, which are spaced apart from one another, in particular in the vehicle longitudinal direction, and are each flexibly coupled with the wheel mount, in particular directly, and at least one connecting element extending obliquely or perpendicularly to the suspension arm parts and arranged between the suspension arm parts and rigidly connected to the suspension arm parts, via which the suspension arm parts are interconnected, wherein the coupling is mounted on the other suspension arm via the connecting part. The coupling is mounted, in particular directly, on the connecting part for this purpose. For example, the connecting part is integrally formed with the suspension arm parts.

Particularly preferably, the one suspension arm is the upper suspension arm, wherein the other suspension arm is the lower suspension arm. Furthermore, it is conceivable that the one suspension arm is the lower suspension arm, wherein the other suspension arm is the upper suspension arm. A large amount of ground clearance can be implemented in this way, since the lowermost bearing point on the vehicle body can be arranged very high.

A second aspect of the invention relates to a holding arrangement of at least one or precisely one wheel on a vehicle body of a motor vehicle, which is designed, for example, as a passenger vehicle. The vehicle body is preferably designed as a self-supporting vehicle body. In the holding arrangement, the wheel is held on the vehicle body via a wheel suspension, in particular via a wheel suspension according to the invention according to the first aspect of the invention. The wheel suspension thus permits compression and extension movements of the wheel in relation to the vehicle body.

In this case, the wheel suspension comprises a wheel mount, on which the wheel is rotatably mounted. In addition, the wheel suspension comprises at least one upper suspension arm flexibly coupled with the wheel mount for guiding the wheel. The wheel suspension additionally has at least one lower suspension arm flexibly coupled with the wheel mount for guiding the wheel. Furthermore, the wheel suspension comprises at least one strut, which has at least one bearing point fixed on the vehicle body, via which the strut is articulated at least indirectly on the vehicle body of the motor vehicle. In particular, the strut is mounted directly on the auxiliary frame or directly on the vehicle body, for example, via the bearing point. The auxiliary frame and the vehicle body are, for example, two components made separately from one another and connected to one another.

To be able to implement an attachment of the wheel on the vehicle body which is particularly favorable with respect to installation space and weight, is provided according to the invention that one of the suspension arms, in particular the upper suspension arm, is flexibly coupled with the strut. The one suspension arm is free of a bearing point fixed on the vehicle body here, via which the one suspension arm is to be articulated on the vehicle body. Furthermore, the strut is flexibly attached to the other suspension arm, i.e., flexibly connected to the other suspension arm, by means of at least one coupling flexibly coupled with the other suspension arm, in particular with the lower suspension arm, and flexibly coupled with the strut. Advantages and advantageous designs of the first aspect of the invention are to be considered advantages and advantageous designs of the second aspect of the invention and vice versa.

A third aspect of the invention relates to a motor vehicle, designed, for example, as a passenger vehicle, which has at least one wheel suspension according to the invention according to the first aspect of the invention and/or at least one holding arrangement according to the invention according to the second aspect of the invention. Advantages and advantageous designs of the first aspect of the invention and the second aspect of the invention are to be considered advantages and advantageous designs of the third aspect of the invention and vice versa.

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another and are therefore to be considered part of the invention individually or in a combination other than that shown. Furthermore, the described embodiments can also be supplemented by further features of the invention already described.

In the figures, functionally-equivalent elements are each provided with the same reference signs.

Figure 1:
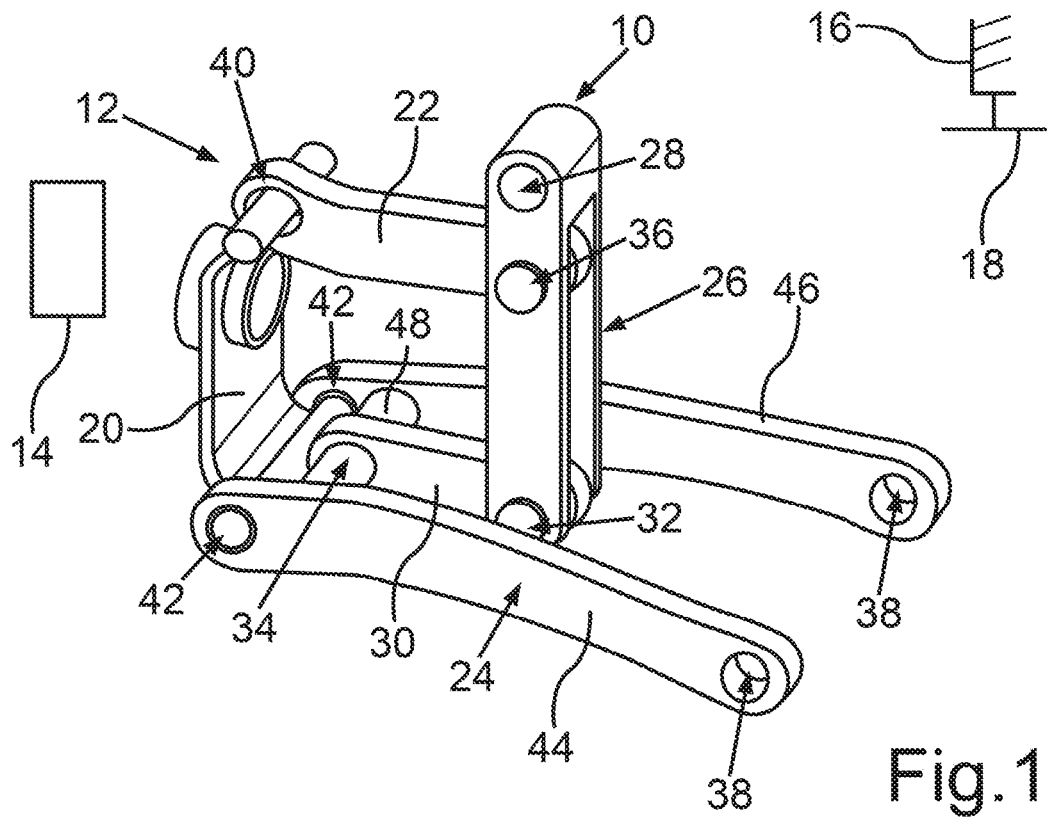
FIG. 1 shows a schematic perspective view of a wheel suspension according to the invention according to a first embodiment.

FIG. 1 shows a schematic illustration of a wheel suspension 10 for a motor vehicle designed in particular as a passenger vehicle. FIGS. 1 to 4 show a first embodiment of the wheel suspension 10. The wheel suspension 10 is in particular part of a holding arrangement 12, in which at least one wheel 14, which is shown particularly schematically in FIG. 1, of the motor vehicle is articulated or held movably on its self-supporting vehicle body 16, which is shown particularly schematically in FIG. 1. The wheel 14 is articulated and thus held movably on the vehicle body 16 via the wheel suspension 10, so that the wheel suspension 10 permits compression and extension movements of the wheel 14 in relation to the vehicle body 16. In the scope of a compression movement of the wheel 14, the wheel 14 moves upward in the vehicle vertical direction in relation to the vehicle body 16. In the scope of an extension movement, the wheel 14 moves downward in the vehicle vertical direction in relation to the vehicle body 16. As to be explained in greater detail hereinafter, the wheel suspension 10 can be flexibly attached directly on the vehicle body 16 or directly on an auxiliary frame 18 shown particularly schematically in FIG. 1, wherein the auxiliary frame 18 is in turn held on the vehicle body 16. The vehicle body 16 and the auxiliary frame 18 are two components made separately from one another and connected to one another.

Thus, for example, the wheel suspension 10 is flexibly held on the vehicle body 16 by means of the auxiliary frame 18. The wheel suspension 10 comprises a wheel mount 20, on which the wheel 14 is to be mounted or is mounted rotatably. The wheel suspension 10 furthermore comprises at least one or precisely one upper suspension arm 22 flexibly coupled with the wheel mount 20 for guiding the wheel 14. Furthermore, the wheel suspension 10 comprises at least one or precisely one lower suspension arm 24 flexibly coupled with the wheel mount 20 for guiding the wheel 14. In addition, the wheel suspension 10 comprises at least one or precisely one strut 26, which is a vertical strut in the exemplary embodiment shown in FIGS. 1 to 4. The strut 26 extends at least in the vehicle vertical direction and in the vertical direction or encloses an extremely acute angle with the vehicle vertical direction in every compression and extension state of the wheel 14. The strut 26 has at least one or precisely one bearing point 28 to be arranged fixed on the vehicle body or fixed on the vehicle body, via which the strut 26 is to be articulated or is articulated at least indirectly on the vehicle body 16.

The bearing point 28 is also referred to as a bearing point on the vehicle body, which is immovable and in particular not pivotable in relation to the vehicle body 16. For example, the strut 26 is mounted via the bearing point 28 directly on the auxiliary frame 18 or directly on the vehicle body 16. In both cases, the bearing point 28 is immovable in relation to the vehicle body, possibly except for any provided technically related and/or intentionally provided elasticities. Such elasticities can result, for example, because the strut 26 is mounted on the bearing point 28 via an elastomer bearing or rubber bearing directly on the auxiliary frame 18 or on the vehicle body 16. The elastomer bearing or rubber bearing permits minor relative movements between the strut 26 and the auxiliary frame 18 or vehicle body 16, wherein the elastomer bearing or rubber bearing damps these relative movements so that a particularly comfortable attachment of the strut 26 on the auxiliary frame 18 or on the vehicle body 16 can be ensured.

The feature that the bearing point 28 is fixed on the vehicle body or is to be arranged fixed on the vehicle body is to be understood in particular to mean that the bearing point 28 defines in particular precisely one first pivot axis common to the strut 26 and the auxiliary frame 18 or the strut 26 and the vehicle body 16, around which the strut 26 is pivotable in relation to the auxiliary frame 18 or the vehicle body 16. An intermediate element flexibly coupled on one side on the bearing point 28 with the strut 26 and on the other side with the auxiliary frame 18 or with the vehicle body 16, which is in turn pivotable in relation to the strut 26 and in relation to the auxiliary frame 18 or the vehicle body 16, is not provided.

To be able to implement an attachment of the wheel 14 on the vehicle body 16 which is particularly favorable with respect to installation space and weight, one of the suspension arms 22 and 14, in the present case the upper suspension arm 22, is flexibly coupled with the strut 26. The upper suspension arm 22 is free of a bearing point fixed on the vehicle body or to be arranged fixed on the vehicle body, via which the upper suspension arm 22 is to be mounted on the vehicle body 16. This means that a rotational axis of the upper suspension arm 22, which is pivotable around the rotational axis in relation to the vehicle body 16, is not mounted directly via bearing on the auxiliary frame 18 or on the vehicle body 16. In other words, the upper suspension arm 22 is exclusively articulated on the vehicle body side on the vehicle body 16 and possibly in this case via the auxiliary frame 18 by means of the strut 26. On the wheel side, the upper suspension arm 22 is flexibly coupled with the wheel mount 20, so that, for example, the upper suspension arm 22 is flexibly coupled with the vehicle body 16 on the wheel side via the wheel mount 22 and lower suspension arm 24. In the exemplary embodiment shown in FIG. 1, it is provided that the upper suspension arm 22 is exclusively flexibly connected to the vehicle body 16 or articulated on the vehicle body 16 overall by means of the strut 26 by means of the wheel mount 20 and the lower suspension arm 24.

Furthermore, the strut 26 is flexibly attached to the lower suspension arm 24, i.e., flexibly connected to the lower suspension arm 24, by means of at least one coupling 30 flexibly coupled with the other suspension arm, in the present case the lower suspension arm 24, and flexibly coupled with the strut 26. The coupling 30 is mounted directly on the strut 26 via a second bearing point 32 spaced apart from the bearing point 28. Due to this direct mounting of the coupling 30 on the strut 26 or by the bearing point 32, in particular precisely one second pivot axis common to the strut 26 and the coupling 30 is formed or defined, around which the strut 26 and the coupling 30 are pivotable in relation to one another. The second pivot axis preferably extends in parallel to the first pivot axis. Furthermore, the coupling 30 is mounted at or via a third bearing point 34 directly on the lower suspension arm 24. Due to this direct mounting of the coupling 30 on the lower suspension arm 24 or by the third bearing point 34, in particular precisely one third pivot axis common to the coupling 30 and the lower suspension arm 24 is formed or defined, around which the coupling 30 and the lower suspension arm 24 can be pivoted in relation to one another.

The third pivot axis extends, for example, in parallel and/or parallel to the second pivot axis. Furthermore, the upper suspension arm 22 is mounted directly on the strut 26 at or via a fourth bearing point 36. Due to this direct mounting of the upper suspension arm 22 on the strut 26 or by the bearing point 36, in particular precisely one fourth pivot axis common to the upper suspension arm 22 and the strut 26 is formed or defined, around which the strut 26 and the suspension arm 22 can be pivoted in relation to one another. The fourth pivot axis extends, for example, in parallel to the third pivot axis and/or the second pivot axis and/or the first pivot axis. In particular, it is provided that the first pivot axis, the second pivot axis, and the fourth pivot axis lie on a common straight line. In addition, the bearing point 36 is arranged in the vehicle vertical direction below the bearing point 28, and the bearing point 32 is arranged in the vehicle vertical direction below the bearing point 36 and below the bearing point 28.

The lower suspension arm 24 has two fifth bearing points 38 to be arranged fixed on the vehicle body or fixed on the vehicle body, via which the lower suspension arm 24 is to be articulated at least indirectly on the vehicle body 16. In the present case, the lower suspension arm 24 is to be mounted or is mounted via the bearing points 38 directly on the auxiliary frame 18 or directly on the vehicle body 16. Due to this direct mounting of the lower suspension arm 24 on the auxiliary frame 18 or on the vehicle body 16 and thus by the bearing points 38, in particular precisely one fifth pivot axis common to the lower suspension arm 24 and the auxiliary frame 18 or the vehicle body 16 is formed or defined, around which the lower suspension arm 24 and the auxiliary frame 18 or the vehicle body 16 can be pivoted in relation to one another.

In addition, the upper suspension arm 22 is mounted directly on the wheel mount 20. The upper suspension arm 22 is mounted here on or via a sixth bearing point 40 directly on the wheel mount 20. Due to this direct mounting of the upper suspension arm 22 on the wheel mount 20 and thus by the sixth bearing point 40, in particular precisely one sixth pivot axis common to the upper suspension arm 22 and the wheel mount 20 is defined or formed, around which the wheel mount 20 and the upper suspension arm 22 can be pivoted in relation to one another. Furthermore, the lower suspension arm 24 is mounted directly on the wheel mount 20 at at least one or in the present case at multiple seventh bearing points 42. Due to this direct mounting of the wheel mount 20 on the lower suspension arm 24 or vice versa, in particular precisely one seventh pivot axis is defined or formed, around which the lower suspension arm 24 and the wheel mount 20 can be pivoted in relation to one another.

Overall, it is apparent that the upper suspension arm 22, the strut 26, the lower suspension arm 24, the wheel mount 20, the auxiliary frame 18, and the vehicle body 16 are respective components which—as described above—can be directly mounted on one another. The respective pivot axis is defined or formed by this respective direct mounting. In this case, the respective direct mounting is to be understood in particular to mean that the respective pivot axis formed by the respective mounting is immovable in relation to the components directly mounted on one another, possibly except for any technically related and/or intentionally provided elasticities, for example, of an elastomer bearing or rubber bearing, via which the components directly mounted on one another are directly mounted on one another. In particular, the direct mounting is to be understood to mean that no intermediate element pivotably mounted on the components directly mounted on one another is provided, by means of which the components directly mounted on one another are mounted on one another, but rather the direct mounting is performed without mediation of such an intermediate element. In this way, the number of parts and thus the installation space requirement and therefore the costs and the weight can be kept in a particularly small scope.

The lower suspension arm 24 formed as a wishbone, for example, has two suspension arm parts 44 and 46, which are spaced apart from one another, in particular in the vehicle longitudinal direction. In this case, the suspension arm part 44 is flexibly connected via one of the bearing points 42 to the wheel mount 42 and thus mounted on the wheel mount 20, wherein the suspension arm part 46 is flexibly connected via the other bearing point 42 to the wheel mount 20 and is thus articulated or pivotably mounted on the wheel mount 20. The lower suspension arm 24 has a connecting part 48 extending obliquely or in the present case perpendicularly to the suspension arm parts 44 and 46 and arranged between the suspension arm parts 44 and 46 and rigidly connected to the suspension arm parts 44 and 46, via which the suspension arm parts 44 and 46 are rigidly connected to one another. The coupling 30 is mounted via the connecting part 48 on the lower suspension arm 24, so that the bearing point 34 is formed by the connecting part 48 and the coupling 30.

Figure 2:
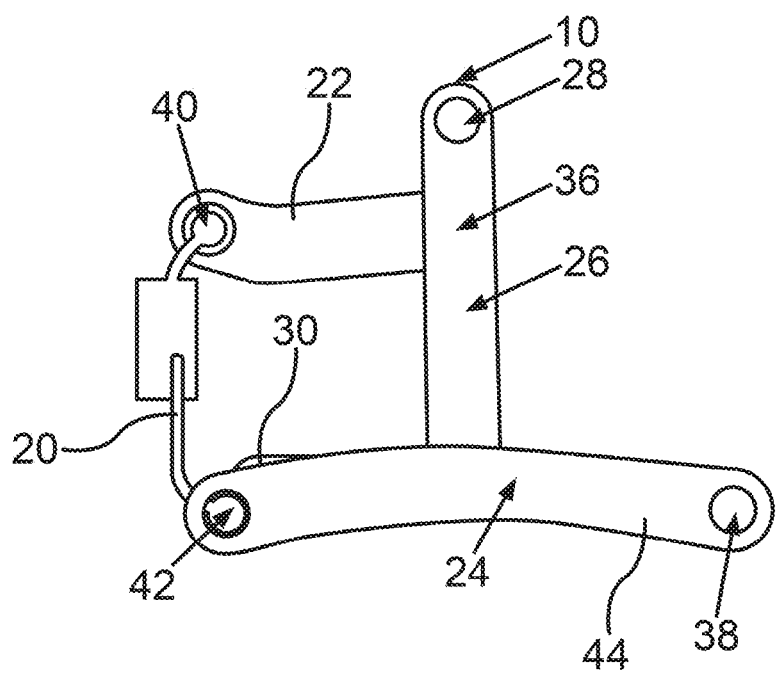
FIG. 2 shows a schematic side view of the wheel suspension in an idle position.

FIG. 2 shows the wheel suspension 10 in an idle position. The wheel suspension 10 assumes the idle position, for example, when the motor vehicle is supported via its wheels in the vehicle vertical direction downwards at least in a horizontal plane and is unloaded at the same time.

Figure 3:
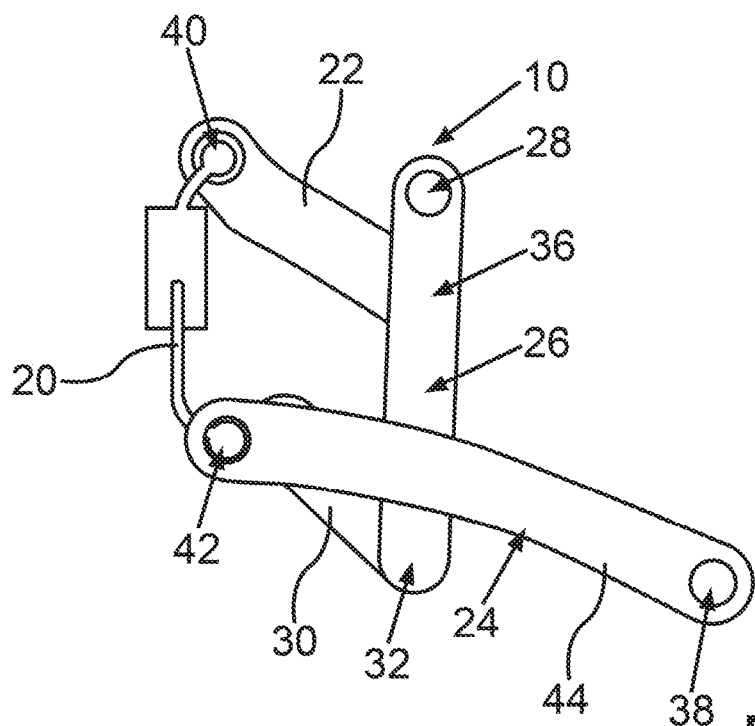
FIG. 3 shows a schematic side view of the wheel suspension in an upper stop position.
Figure 4:
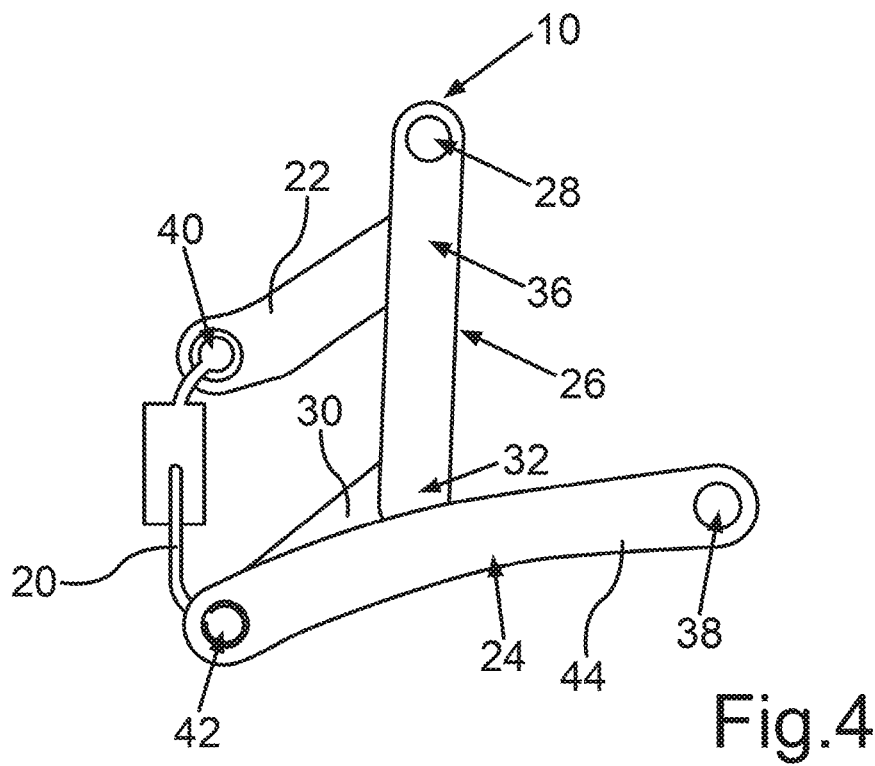
FIG. 4 shows a schematic side view of the wheel suspension in a lower stop position.

FIG. 3 shows the wheel suspension 10 in an upper stop position, wherein the wheel suspension 10 assumes the upper stop position when the wheel 14 is maximally compressed. Finally, FIG. 4 shows the wheel suspension 10 in a lower stop position. The wheel suspension 10 assumes the stop position, for example, when the wheel 14 is completely extended. A spring travel and a camber curve of the wheel 14 and the wheel suspension 10 are recognizable particularly well from FIGS. 2 to 4.

The wheel suspension 10 is associated, for example, with an axle of the motor vehicle, wherein the axle can have, for example, at least or precisely wheel suspensions 10 spaced apart from one another in the vehicle transverse direction. The axle can be designed as a steerable or non-steerable axle and can thus be equipped with or without bumpers. Furthermore, the axle can be a driven axle or a nondriven axle, so that the wheel 14 is, for example, a driven or nondriven wheel. Furthermore, the axle can be designed as a front axle or rear axle.

In the exemplary embodiment illustrated in the figures, the wheel suspension 10 comprises precisely one upper suspension arm in the form of the upper suspension arm 22. Alternatively thereto, it is conceivable that the wheel suspension 10 comprises multiple upper suspension arms 22. If the wheel suspension comprises multiple upper suspension arms, for example, like the suspension arm 22, thus, for example, only one of the upper suspension arms can be formed like the suspension arm 22 and can thus be flexibly connected to the vehicle body 16 or articulated on the vehicle body 16 by means of the strut 26 and thus cannot have a direct mounting fixed on the vehicle body, or a plurality of the suspension arms or all suspension arms each have a separate strut, by means of each of which the multiple or all upper suspension arms are flexibly connected to the vehicle body 16. Furthermore, it is conceivable that multiple or all of the suspension arms are mounted on the strut 26 comment to the multiple suspension arms and are mounted by means of the strut 26 on the vehicle body, so that the statements above and hereinafter on the upper suspension arm 22 can be transferred to the multiple upper suspension arms or to all upper suspension arms.

The wheel suspension 10 is readily combinable with a lower bar link and/or a triangular link and/or a trapezoidal link. The strut 26 is, for example, a vertical strut and is thus arranged at least essentially vertically, however, other alignments or orientations of the strut 26 can also be provided.

The bearing point 28 on the vehicle body or fixed on the vehicle body of the strut 26 can be arranged in position in the vicinity of a shock absorber bearing, on which a shock absorber also referred to as a damper is mounted. By means of the shock absorber, for example, the compression and extension movement of the wheel 14 can be damped. A compact and rigid bearing point on the shell side can result due to the arrangement of the bearing point 28 on the vehicle body in the vicinity of the shock absorber location. Furthermore, the wheel suspension 10 can have a spring suspension, which is tensioned, for example, by compression movements of the wheel 14 and thus provides a spring force, by means of which the wheel 14 is movable downward in the vehicle vertical direction in relation to the vehicle body, so that the extension movements of the wheel 14 are movable by means of the springs. The shock absorber, the springs, and possibly a stabilizer can be attached on the axle at multiple points, advantageously, for example, on the wheel mount 20 and/or on the lower suspension arm 24.

Figure 5:
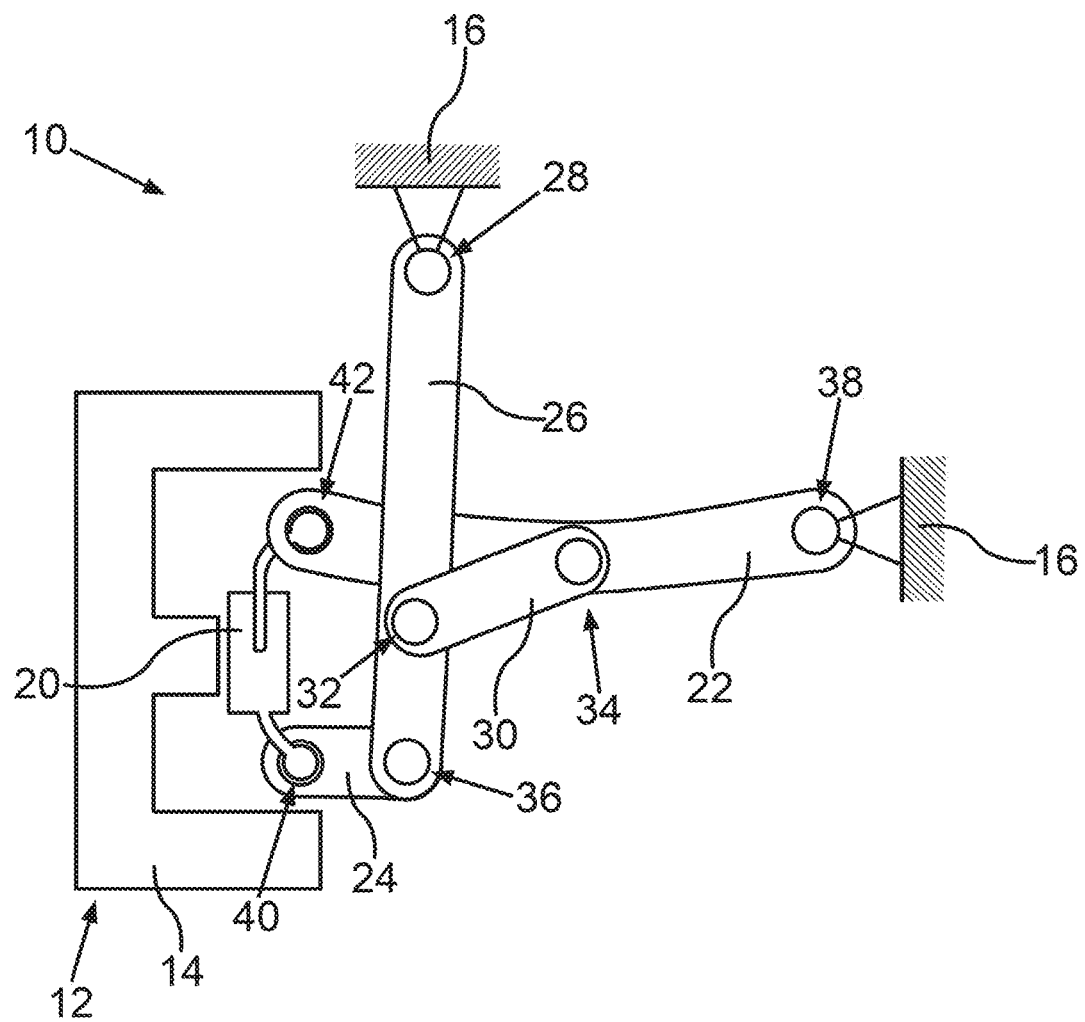
FIG. 5 shows a schematic side view of the wheel suspension according to a second embodiment.

FIG. 5 shows a schematic side view of a second embodiment of the wheel suspension 10. In the first embodiment, the one suspension arm is the upper suspension arm 22, while the other suspension arm is the lower suspension arm 24. In contrast, in the second embodiment the one suspension arm is the lower suspension arm 24, while the other suspension arm is the upper suspension arm 22. This means that in the second embodiment the lower suspension arm 24 is flexibly coupled with the strut 26, wherein the lower suspension arm 24 is free of a bearing point to be arranged fixed on the vehicle body, via which the lower suspension arm 24 is to be mounted or is mounted on the vehicle body 16. In addition, the strut 26 is flexibly attached to the upper suspension arm 22 by means of the coupling 30 flexibly coupled with the upper suspension arm 22 and flexibly coupled with the strut 26.

The coupling 30 is mounted directly on the strut 26 via the second bearing point 32 spaced apart from the bearing point 28. Furthermore, the coupling 30 is mounted directly on the upper suspension arm 22 at or via the third bearing point 34. Furthermore, the lower suspension arm 24 is mounted directly on the strut 26 at or via the fourth bearing point 36. The upper suspension arm 22 has at least one bearing point 38 to be arranged fixed on the vehicle body or fixed on the vehicle body, via which the upper suspension arm 22 is to be articulated at least indirectly on the vehicle body 16. In the present case, the upper suspension arm 22 is to be mounted or is mounted via the bearing point 38 directly on the auxiliary frame 18 or directly on the vehicle body 16. In addition, the lower suspension arm 24 is mounted directly on the wheel mount 20. The lower suspension arm 24 is mounted here directly on the wheel mount 20 and or via the bearing point 40. Furthermore, the upper suspension arm 22 is articulated directly on the wheel mount 20 on the at least one bearing point 42.

The invention claimed is:
1. A wheel suspension for a motor vehicle, comprising:
a wheel mount on which a wheel of the motor vehicle is to be rotatably mounted;
a strut having a first bearing point that is fixed on a vehicle body of the motor vehicle, via which the strut is articulated at least indirectly on the vehicle body;
a first suspension arm flexibly coupled with the wheel mount for guiding the wheel, and flexibly coupled with the strut, the first suspension arm being free of a bearing point that is fixed on the vehicle body for mounting the first suspension arm on the vehicle body; and
a second suspension arm flexibly coupled with the wheel mount for guiding the wheel, and flexibly attached to the strut by a coupling, the coupling being flexibly coupled with both the second suspension arm and the strut;
wherein the strut has a second bearing point fixed on the strut, the second bearing point being arranged in a vehicle-vertical direction below the first bearing point;
wherein the strut has a third bearing point fixed on the strut, the third bearing point being arranged in a vehicle-vertical direction below the first bearing point;
wherein the first suspension arm is mounted on the strut via the second bearing point; and wherein the coupling is mounted on the strut via the third bearing point.

2. The wheel suspension as claimed in claim 1, wherein the coupling is mounted directly on the second suspension arm.

3. The wheel suspension as claimed in claim 2, wherein the coupling is mounted directly on the strut.

4. The wheel suspension as claimed in claim 2, wherein the first suspension arm is mounted directly on the strut.

5. The wheel suspension as claimed in claim 2, wherein:
the second suspension arm has at least one further bearing point that is fixed on the vehicle body, via which the second suspension arm is articulated at least indirectly on the vehicle body.

6. The wheel suspension as claimed in claim 2, wherein the first suspension arm is mounted directly on the wheel mount.

7. The wheel suspension as claimed in claim 1, wherein the coupling is mounted directly on the strut.

8. The wheel suspension as claimed in claim 7, wherein the first suspension arm is mounted directly on the strut.

9. The wheel suspension as claimed in claim 7, wherein:
the second suspension arm has at least one further bearing point that is fixed on the vehicle body, via which the second suspension arm is articulated at least indirectly on the vehicle body.

10. The wheel suspension as claimed in claim 1, wherein the first suspension arm is mounted directly on the strut.

11. The wheel suspension as claimed in claim 10, wherein:
the second suspension arm has at least one further bearing point that is fixed on the vehicle body, via which the second suspension arm is articulated at least indirectly on the vehicle body.

12. The wheel suspension as claimed in claim 1, wherein:
the second suspension arm has at least one further bearing point that is fixed on the vehicle body, via which the second suspension arm is articulated at least indirectly on the vehicle body.

13. The wheel suspension as claimed in claim 1, wherein the first suspension arm is mounted directly on the wheel mount.

14. The wheel suspension as claimed in claim 1, wherein the second suspension arm is mounted directly on the wheel mount.

15. The wheel suspension as claimed in claim 1, wherein:
the second suspension arm has two suspension arm parts spaced apart from one another;
each of the two suspension arm parts is flexibly coupled with the wheel mount and to at least one connecting part arranged between and rigidly connected to the suspension arm parts, the at least one connecting part extending obliquely or perpendicularly to the suspension arm parts;
the suspension arm parts are connected to one another via the at least one connecting part; and
the coupling is mounted via the connecting part on the second suspension arm.

16. The wheel suspension as claimed in claim 1, wherein:
the first suspension arm is an upper suspension arm; and
the second suspension arm is a lower suspension arm.

17. The wheel suspension as claimed in claim 1, wherein:
the first suspension arm is a lower suspension arm; and
the second suspension arm is an upper suspension arm.

18. A holding arrangement comprising:
at least one wheel on a vehicle body of a motor vehicle, in which the wheel is held flexibly on the vehicle body via a wheel suspension, including a wheel mount, on which the wheel is rotatably mounted;
a strut having a first bearing point that is fixed on the vehicle body, via which the strut is articulated at least indirectly on the vehicle body;
a first suspension arm flexibly coupled with the wheel mount for guiding the wheel and flexibly coupled with the strut, the first suspension arm being free of a bearing point that is fixed on the vehicle body for mounting the first suspension arm on the vehicle body; and
a second suspension arm flexibly coupled with the wheel mount for guiding the wheel and flexibly attached to the strut by a coupling, the coupling being flexibly coupled with both the second suspension arm and the strut;
wherein the strut has a second bearing point fixed on the strut, the second bearing point being arranged in a vehicle-vertical direction below the first bearing point;
wherein the strut has a third bearing point fixed on the strut, the third bearing point being arranged in a vehicle-vertical direction below the first bearing point;
wherein the first suspension arm is mounted on the strut via the second bearing point; and
wherein the coupling is mounted on the strut via the third bearing point.

* * * * *